United States Patent [19]

Bell

[11] 4,378,674
[45] Apr. 5, 1983

[54] VARIABLE APERTURE ANNULAR NOZZLE FOR ROCKET MOTOR IGNITER

[75] Inventor: Frank H. Bell, Logan, Utah

[73] Assignee: Thiokol Corporation, Newtown, Pa.

[21] Appl. No.: 247,706

[22] Filed: Mar. 26, 1981

[51] Int. Cl.³ .............. F02C 7/26; F02K 1/00; F02K 9/95; F02K 9/97
[52] U.S. Cl. .............. 60/39.823; 60/254; 60/256; 60/271; 102/202
[58] Field of Search .............. 60/39.82 E, 39.82 P, 60/271, 256, 253, 254; 102/202, 203, 204; 239/514, 456, 515

[56] References Cited

U.S. PATENT DOCUMENTS

| | | | |
|---|---|---|---|
| 571,940 | 11/1896 | Binford | 239/456 |
| 2,481,059 | 9/1949 | Africano | 60/271 |
| 2,870,599 | 1/1959 | Long | 60/271 |
| 3,167,912 | 2/1965 | Ledwith | 60/254 |
| 3,234,731 | 2/1966 | Dermody | 60/271 |

Primary Examiner—Carlton R. Croyle
Assistant Examiner—Jane E. Obee
Attorney, Agent, or Firm—Thomas W. Brennan; Gerald K. White

[57] ABSTRACT

A single port rocket motor igniter nozzle features an adjustable throat or annulus that is formed by a tapered flange and an opening in an igniter body that contains a propellant charge, the position of the flange relative to the opening being adjustable to vary the throat area by a calibrated central shaft. The igniter allows rapid evaluation of propellant grain designs and nozzle throat areas, and as a result, enables the faster development and assembly of a less expensive igniter that is operative to produce at optimum pressure and burning rate, and to effectively propagate, the high temperature gases that are needed for rocket motor propellant ignition.

12 Claims, 3 Drawing Figures

VARIABLE APERTURE ANNULAR NOZZLE FOR ROCKET MOTOR IGNITER

BACKGROUND OF THE INVENTION

1. Field of the Invention

This invention relates to ignition devices or igniters for igniting solid propellant rocket motors, and more particularly, to an improvement that facilitates the development and assembly of inexpensive igniters that are compatible with the rocket motor solid propellants that they are designed to ignite.

2. Description of the Prior Art

In the design and development of igniters for solid propellant rocket motors, the igniter size and characteristic operation, as calculated by the rocket motor engineer, may be a bit off, that is, slightly incorrect. When such an error in calculation occurs, the igniter burn rate may be somewhat incompatible with the ignition characteristics of the rocket motor solid propellant that is intended to be ignited.

Prior art procedures for making corrections for such errors have been expensive and time consuming. It is difficult to change the characteristic behavior of the solid propellant charge used in the igniter as by changing its formulation or geometry. It is also difficult to recalculate and to refabricate the igniter.

In the prior art, ignition of conventional solid propellant rocket motors usually has been by either of two methods. Early rocket motor designs and many smaller motors currently in production use so-called bag igniters including a squib or electric match in the bag with a granular or pelletized first fire agent. One form of such a bag igniter is disclosed in U.S. Pat. No. 3,357,190 granted on Dec. 12, 1967 to H. W. D. Cassidy et al. Such igniters are not well adapted to development and evaluation. Moreover, they have been found to be disadvantageous because of the lack of protection of the deflagrating material contained in the bag from damage tending to result from mechanical shock or exposure to harmful gases in the environment in which the igniters are stored before they are used.

Larger and more recent solid propellant rocket motors have employed as an igniter a miniature rocket motor together with an appropriate first fire device. Igniters of this type are disclosed in U.S. Pat. Nos. 2,897,649 granted Aug. 4, 1959 to R. Reddy and 3,069,843 granted Dec. 25, 1962 to T. S. Whitsell, Jr. This type of igniter has one or more nozzles, is quite complex and expensive to build, and includes reciprocating members that change the nozzle area as a function of chamber pressure or control forces. Such igniter structures consequently also are not well adapted to a development and evaluation situation.

Accordingly, there exists a need in the art of igniting rocket motor solid propellants for an improvement that will facilitate the development and assembly of a simple and inexpensive igniter that is operative without change in a particular solid propellant charge that it is desired to employ, to produce at optimum pressure and burning rate, and to effectively propagate, the high temperature gases that are required for proper ignition of the propellant in the rocket motor in which the igniter is to be used.

SUMMARY OF THE INVENTION

An object of the invention is to provide a rocket motor solid propellant igniter in which the igniter pressure and propellant burning rate can be varied, without propellant or grain geometry changes, to make the igniter, in its ignition function, compatible with the rocket motor propellant ignition characteristics.

Another object of the invention is to provide such an igniter that is reusable, having simple and effective provisions for the removal from the igniter body of the consumed propellant residue and the replacement thereof with a fresh propellant.

A further object of the invention is to provide such an igniter that features 360° radial gas flow for maximum rocket motor propellant grain impingement.

Still another object of the invention is to provide such an igniter that is simple and inexpensive and features an annular nozzle that is easily variable over a wide range of aperture area.

Another object of the invention is to provide in such an igniter simple and effective means for calibrating the nozzle aperture area.

A further object of the invention is to provide such an igniter comprising a simple body of revolution that allows simple fabrication methods.

Still another object of the invention is to provide a simple single nozzle rocket motor propellant igniter assembly that has an adjustable nozzle aperture area whereby rapid evaluation of propellant grain design and aperture area is permitted and faster and less expensive development allowed of an igniter that is operative to produce, at optimum pressure and burning rate, and to effectively propagate, the high temperature gases required for rocket motor propellant ignition.

In accomplishing the foregoing and other objectives of the invention, there is provided a single port igniter nozzle featuring an adjustable throat area, an annulus, that is formed by an insulated tapered flange or plug made of a suitable refractory material, such as a high tensile strength ceramic. The flange is adjustably positioned by a movable central pin or shaft at the outlet of a combustion chamber that is formed in the body of the igniter, which chamber includes a propellant charge. The nozzle port area is varied by moving the central shaft forward or aft. The adjusted position or location of the shaft and thereby the plug may be maintained by a jam nut or other simple device, suitable calibrating marks provided on the shaft facilitating adjustment to a desired position.

In accordance with the invention, the body of the igniter comprises a simple body of revolution, and hence, provides for simple fabrication methods. The single port or vent nozzle structure features 360° radial gas flow for maximum rocket motor propellant grain impingement. The nozzle structure is easily variable over a wide range of aperture area. Since the aperture or nozzle area may be varied, the pressure within the combustion chamber of the igniter can be varied without a change of propellant formulation or geometry. Additionally, since the combustion chamber pressure may be varied, the propellant burning rate also may be varied without propellant or grain geometry changes.

These characteristics of the rocket motor igniter of the present invention permit rapid evaluation of a number of propellant grain designs and nozzle areas.

BRIEF DESCRIPTION OF THE DRAWINGS

Further advantages of the present invention will emerge from the following description taken in conjunction with the accompanying drawings in which.

DESCRIPTION OF THE PREFERRED EMBODIMENT

Figure 1:
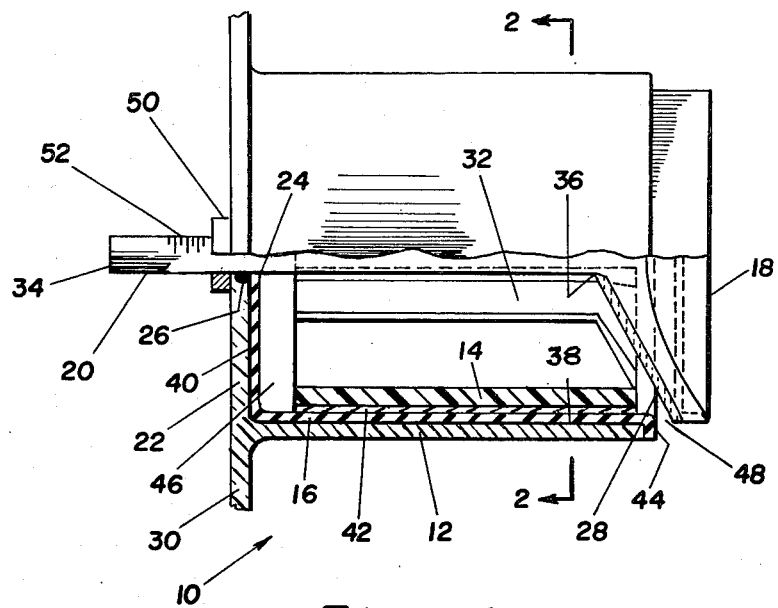
FIG. 1 is a longitudinal view partly in section of a rocket motor igniter constituting a preferred embodiment of the invention.

FIG. 1 illustrates a variable aperture annular nozzle for rocket motor igniter 10 having an igniter body 12, a solid cylindrical internally star-shaped, propellant charge 14, an insulation member 16, an adjustable nozzle plug comprising an annular flange 18, and a movable central pin or shaft 20.

Igniter body 12, as seen in the drawing, has the form of a cylindrical vessel that is closed at one end by a transverse wall 22 and is made of a suitable material such as steel or aluminum. Transverse wall 22 has a centrally located opening 24 therein through which shaft 20 extends, a suitable O-ring 26 being provided for effecting a gas tight seal. For convenience, opening 24 is referred to hereinafter as a first opening in body 12, and the open end 28 of the body 12, which end 28 is opposite the transverse wall 22, is referred to as a second opening in body 12.

Transverse wall 22 of igniter body 12 is formed integrally with a member 30 that is provided for attaching the igniter 10 to the rocket motor in which it is to be used.

Shaft 20 is located centrally of body 12 and extends longitudinally thereof through the central opening or axial bore 32 of propellant charge 14. A first end 34 of shaft 20 extends exteriorly of body 12 and a second end 36 thereof is fixedly attached to the flange 18 at a central location of the latter.

Insulation member 16 covers an internal cylindrical wall 38 of body 12 and an internal wall 40 of transverse wall 22. Member 16 desirably is made of a material such as polyisoprene and may be cast in the vessel to cover the internal cylindrical wall 38 and the internal transverse wall 40. A suitable adhesive, not shown, may, if desired, be used to bind the external surface of propellant charge 14 to the insulation member 16.

Figure 2:
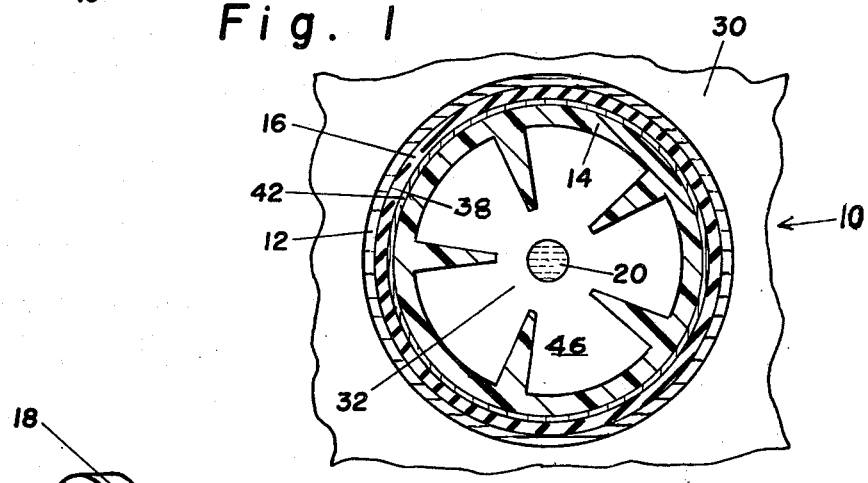
FIG. 2 is a cross section of the igniter of FIG. 1 taken along the lines 2—2.
Figure 3:
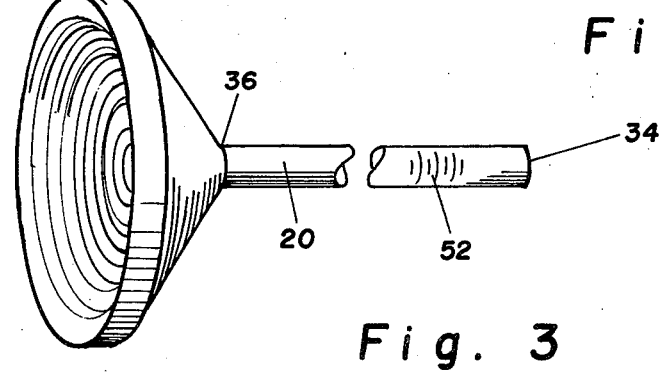
FIG. 3 is a perspective view of the shaft, partially broken away, and the attached plug of FIG. 1.

Preferably, however, and as illustrated in FIGS. 1 and 2, the propellant 14 is contained within a suitable cardboard sleeve indicated at 42, thereby providing a layer of cardboard between the insulation coating 16 and the propellant 14. For facilitating development and evaluation, cardboard sleeve covered propellant charges may be provided as an off-the-shelf item. A propellant charge 14, surrounded by cardboard sleeve 42, may be readily force fit into igniter body 12 through the second opening 28. Suitable means such as one or more O-rings about the outer surface of sleeve 42 may be provided, if necessary, to retain the propellant 14 and sleeve 42 within the igniter body 12. Alternatively, or additionally, an adhesive may also be employed to bind the propellant 14 within the sleeve 42 and to bind the sleeve 42 to the insulation member 16. Following use of the igniter 10 to ignite the propellant of a rocket motor, the residue of the spent propellant 14 and the charred remains of cardboard sleeve 42 may be removed from igniter body 12 as by scraping or other suitable means, and a fresh propellant 14 with its cardboard sleeve 42 inserted within body 12. This facilitates restoration of igniter 10 for further use as an igniter.

While propellant 14 in FIG. 2 is illustrated as being internally star-shaped and having five tines, it will be understood that the geometry of the propellant 14 is not critical for the purposes of the present invention. Any of the many propellant geometrical configurations having a central opening or axial bore as at 32 that are available may be employed.

Flange 18 is an insulated tapered plug and is positioned with respect to the circular rim 44 of the second opening 28 in the igniter body 12 by moving the central shaft 20 forward and aft. Flange 18 and rim 44 of body 12 cooperate to form an enclosed space or chamber 46 within igniter body 12, and an outlet for the chamber 46 comprising a variable annular nozzle or aperture 48. As seen in the drawing, the area of the annular aperture 48 is adjustable in a predetermined manner in accordance with the position or plane to which the flange 18 is adjusted with respect to the second opening 28 and rim 44 of body 12. Location of the flange 18 at a given station plane may be by the expedient of a hard stop on shaft 20 such as a precision washer, jam nut or other locking device, as shown at 50. Device 50 when adjusted to its locking position holds the shaft 20 firmly against movement in the first opening 24 in body 12 and thereby holds the flange 18 in the station plane to which it has been adjusted.

Flange 18 and shaft 20 may be made of suitable refractory material such as ceramic, tungsten, etc., a high tensile strength ceramic being preferred for flange 18. Shaft 20 may be a molded ceramic material and may be solid or hollow, as desired. In this connection, it is noted that in a rocket igniter fatigue strength is not an important design consideration.

Ignition of the propellant charge 14 may be effected in any suitable manner known in the prior art, as for example, an electric match comprising a bridgewire, associated pyrotechnic material suitably located within chamber 46, and including electrical leads extending through the wall of body 12. Such ignition means form no part of the present invention and are not illustrated in order to avoid undue complication of the drawing.

With the rocket motor igniter structure, as illustrated and described, it is seen that the single vent nozzle arrangement features 360° radial or conical gas flow of the high temperature gases that are generated within chamber 46 upon ignition of the propellant charge 14. This provides for maximum propellant grain impingement in the rocket motor with which the igniter 10 is operatively associated.

By means of the manipulation of jam nut 50 and the movement, forward or aft, of the shaft 20, the area of the annular aperture 48 is easily variable over a wide range thereby correspondingly to vary the conical gas flow from chamber 46. For facilitating the adjustment of the variable aperture 48 to a desired size, desirably there are provided calibration markings 52 on shaft 20 in association with the jam nut 50. These markings 52 enable a record to be kept of the adjustments made to the variable aperture 48 between shots and enable a rapid evaluation of a number of propellant grain designs and areas of aperture 48.

Being a simple body of revolution cylindrical in character, the igniter body 12, flange 18 and shaft 20 enable simple fabrication methods to be employed, and hence, a less expensive igniter to be assembled than has been available in the prior art.

It is noted as a feature of utmost significance that since the area of the annular nozzle or aperture 48 may be varied, the pressure within the chamber 46 upon combustion of propellant 14 can be varied without a change of propellant formulation or geometry.

Additionally, and similarly of utmost significance is that since the igniter pressure may be varied, the burning rate of the propellant 14 may be varied without propellant or grain geometry changes.

Accordingly, the adjustable throat area or annulus 48 allows igniter development to be faster, and therefore, less expensive. The nozzle annulus area 48 is adjusted between shots. Permitting rapid evaluation of a number of grain designs and areas of nozzle 48, the arrangement is well adapted to a development situation, and enables a less expensive igniter to be assembled.

Thus, there has been provided, in accordance with the present invention, a single port rocket igniter nozzle featuring an adjustable throat or annulus 48 that is formed by a tapered flange 18 and an opening 28 in the igniter body 12 containing propellant charge 14 in chamber 46 therein, the flange 18 being readily adjustable in position to vary the throat area 48 by a movable calibrated central shaft 20 that is arranged to be locked in position by a simple jam nut 50. The structure is characterized in its provisions that allow rapid evaluation of propellant grain designs and nozzle or throat areas, and hence, enable the faster development and assembly of a less expensive igniter that is operative to produce at optimum pressure and burning rate, and to effectively propagate, the high temperature gases that are needed for rocket motor propellant ignition.

What is claimed is:

1. An ignition device comprising
   a body forming a combustion chamber having oppositely disposed first and second openings in the wall thereof, at least the second of said openings being generally circular,
   an insulation coating on the wall of the chamber between the chamber wall first and second openings,
   a propellant charge having an axial bore and substantially filling the coated portion of the chamber wall with the bore of the charge extending longitudinally between the chamber wall first and second openings,
   a shaft having a first end and a second end, said shaft extending in sealing manner through the first opening in the wall of the chamber and through the bore of said charge with the second end thereof in position adjacent the second opening in the chamber wall, and
   a plug supported by the second end of said shaft adjacent the second chamber wall opening, said plug having an annular flange that diverges outwardly with respect to the second chamber wall opening thereby forming an annular aperture the area of which is predetermined in accordance with the adjusted position of said shaft within the chamber.

2. An ignition device as specified in claim 1 wherein the first end of said shaft extends exteriorly of said body.

3. An ignition device as specified in claim 2 including means associated with said body and the first end of said shaft for facilitating manual adjustment of the location of said plug with respect to the second chamber wall opening and thereby the area of the annular aperature.

4. An ignition device as specified in claim 3 wherein said means include calibration markings on said shaft.

5. An ignition device as specified in claim 4 wherein said manual adjustment means further includes a jam nut.

6. An ignition device as specified in claim 4 further including O-ring seals associated with the shaft for sealing the first chamber wall opening.

7. An ignition device as specified in claim 1 wherein said shaft and plug are each made of refractory materials.

8. An ignition device as specified in claim 7 wherein said shaft is made of a molded ceramic material.

9. An ignition device as specified in claim 7 wherein said plug is made of a high tensile strength ceramic material.

10. An ignition device as specified in claim 1 wherein said insulation coating is heat insulating and further including a layer of cardboard between said propellant and said insulation coating.

11. An ignition device as specified in claim 10 wherein the shape of said chamber and the shape of the exterior of said propellant charge are generally cylindrical.

12. An ignition device as specified in claim 11 wherein the first end of said shaft extends exteriorly of said body and including means associated with said body and the first end of said shaft for facilitating manual adjustment of the location of said plug with respect to the second chamber wall opening and thereby the area of the annular aperture, wherein said manual adjustment means comprises a jam nut, further including O-ring seals associated with the shaft for sealing the first chamber wall opening, wherein said insulation coating is heat insulating composition, wherein said shaft is made of a molded ceramic material and said plug is made of a high tensile strength ceramic material, and, wherein the shapes of said body is generally cylindrical.

* * * * *